US006322843B1

(12) United States Patent
Schuurman et al.

(10) Patent No.: US 6,322,843 B1
(45) Date of Patent: Nov. 27, 2001

(54) RECIRCULATION PROCESS FOR A FAT CONTINUOUS SPREAD

(75) Inventors: Johannes Henricus Schuurman, Laurel; Podutoori Ravinder Reddy; Bart Barmentlo, both of Columbia, all of MD (US); Freek Reckweg, Buchenberg (DE)

(73) Assignee: Van den Bergh Foods Company, division of Conopco, Inc., Lisle, IL (US)

( * ) Notice: Subject to any disclaimer, the term of this patent is extended or adjusted under 35 U.S.C. 154(b) by 0 days.

(21) Appl. No.: 08/491,769

(22) Filed: Jun. 19, 1995

(51) Int. Cl.[7] .................................................. A23D 7/02
(52) U.S. Cl. .......................................... 426/603; 426/602
(58) Field of Search .................................. 426/603, 606, 426/607

(56) References Cited

U.S. PATENT DOCUMENTS

| 4,230,737 | * | 10/1980 | Heider ................................ 426/607 |
| 4,316,919 | * | 2/1982 | Pelloso ............................... 426/607 |
| 4,341,813 | * | 7/1982 | Ward .................................. 426/607 |
| 4,386,111 | * | 5/1983 | Van Heteren ....................... 426/607 |
| 4,388,339 | * | 6/1983 | Lomneth ............................. 426/607 |
| 4,396,639 | * | 8/1983 | Bodor ................................. 426/607 |
| 4,425,371 |   | 1/1984 | Stratmann et al. . |
| 4,460,614 | * | 7/1984 | Stratmann .......................... 426/603 |
| 5,169,668 | * | 12/1992 | Milo .................................. 426/603 |
| 5,302,408 |   | 4/1994 | Cain et al. . |
| 5,374,445 | * | 12/1994 | Havenstein ......................... 426/603 |
| 5,407,695 | * | 4/1995 | Wheeler ............................. 426/603 |
| 5,858,441 | * | 1/1999 | Reddy ................................. 426/603 |
| 5,858,445 | * | 1/1999 | Huizinga ............................. 426/603 |
| 5,904,949 | * | 5/1999 | Reddy ................................. 426/603 |
| 5,989,618 | * | 11/1999 | Thurman ............................. 426/603 |
| 6,025,010 | * | 2/2000 | Reddy ................................. 426/603 |
| 6,045,853 | * | 4/2000 | Reddy ................................. 426/603 |
| 6,171,637 | * | 1/2001 | Reddy . |
| 6,203,842 | * | 3/2001 | Reddy ................................. 426/603 |

FOREIGN PATENT DOCUMENTS

| 2239256 | * | 6/1991 | (GB) ................................... 426/603 |
| 94/22319 | * | 10/1994 | (WO) ................................... 426/603 |

OTHER PUBLICATIONS

Gunstone 1983 Lipids in Foods Chemistry, Biochemistry & Technology Pergamon Press Oxford p 147–155.*
Copending applications: Huizinga et al.—Ser. No. 08/557,551—Filed Jan. 14, 1995—Pending.
Thurman et al.—Ser. No. 08/496,856—Filed Jun. 19, 1995—Pending.
Sassen—Ser. No. 08/437,191—Filed May 8, 1995—Pending.
Reddy et al.—Ser. No. 08/491,663—Filed Jun. 19, 1995—Pending.

* cited by examiner

Primary Examiner—Carolyn Paden
(74) Attorney, Agent, or Firm—Edward A. Squillante, Jr.

(57) ABSTRACT

The process for pairing a fat continuous spread having from about 30 about 80% fat and having a trans fatty acid level of less than about 10% is described. An interesterified hardstock as described herein is combined with liquid oil to form a fat phase. The fat phase and an aqueous phase are combined to form an emulsion which is crystallized to form substantially beta prime crystals in the C-unit. The beta prime containing crystal containing emulsion is the emulsion exiting the initial A-unit at a throughput of the emulsion through the entire production line of x kilograms per hour, a residence time of the emulsion in the crystallizing (C-unit) of y minutes and the recirculation flow rate of the emulsion recirculated into the cooled partially crystallized emulsion of 0.2 x to 10 x to form the fat continuous product.

10 Claims, 2 Drawing Sheets

RECIRCULATION PROCESS FOR A FAT CONTINUOUS SPREAD

FIELD OF THE INVENTION

The invention relates to a process of forming a fat continuous spread having up to 80% of a fat phase and having a trans fatty acid level of less than 10%. The process involves recirculating an emulsion which has been at least partially crystallized into an emulsion stream which is exiting from a scrapped surface heat exchanger unit (A-unit) in a production line to modify residence time and increase crystallation rate by seeding and provide an improved spread product.

BACKGROUND OF THE INVENTION

The prior art processes of forming a fat continuous product involved the mixing of an aqueous and a fat phase at room temperature (greater than 30° C.) or above and then cooling the formed emulsion in one or more scrapped surface heat exchanger units (A-units) to cool the emulsion and start the crystallization process by removing the heat of crystallization. The cooled emulsion then passes from the A-unit into one or more C-units where crystallization continues to substantially form beta prime fat crystals of the product. Depending on the desirable residence time additional C-units and B-units may be added to the production line the typical residence time for fat continuous products having a trans fatty acid level of greater than about 10% is 30 seconds to 5 minutes.

Lately, consumer trends have been towards spread products which spread easily, have a good melting behavior in both the mouth and on heated food items, contain a relatively high proportion of unsaturated fatty acids and at the same time have a relatively low trans fatty acid level, preferably lower than 10%. In general butter has a trans fatty acid content of about 7 to 8%.

The higher the level of trans fatty acid in the fat phase of a spread, the shorter the residence time needed during processing to crystallize the fat to form the desirable characteristics of the spread. As the trans fatty acid content is reduced, residence times must be increased in order to avoid post crystallization of the fat during storage which leads to brittle and unspreadable products. Adding additional units to the production line increases cost and removes flexibility of modifying the process line configuration.

There therefore exists a need for a process to prepare a spread having less than 80% fat and less than 10% trans fatty acid levels, which has exceptable consumer properties such as good spreading and good organoleptic characteristics.

Another object of the invention is to provide an improved process for forming fat continuous products which is both economical and yet flexible enough to be modified to achieve desirable residence time in line in processing fat spreads with varying levels of trans content.

SUMMARY OF THE INVENTION

This invention relates to a novel process for producing a fat continuous spread which has up to 80% fat, less than 10% trans fatty acid content and provides the required residence time in line for the transition of alpha to beta prime fat crystals by recirculation of a partially crystallized cooled emulsion to a cooled feed stream. More particularly, the emulsion is cooled in an A-unit to a temperature below the temperature required to form alpha phase crystals of the fat and then passed into a crystallizing unit (C-unit) or C-units for a residence time required to convert the fat crystals from their alpha phase to beta prime phase. Following the transition of the fat crystals to the beta prime phase, the emulsion is cooled again to a temperature of at least the temperature of the first A-unit and then the emulsion is recirculated back into the partially crystallizing emulsion stream exiting the initial A-unit and referred to as the cooled feed stream. The residence time in the C-unit required to form the proper fat crystals in the low trans fatty acid containing fat is related to the throughput of the emulsion through the in line production system as well as the recirculation rate of the cooled emulsion exiting a second A-unit. The recirculation step into the cooled emulsion stream provides the longer residence time required for spreads having less than 10% trans fatty acids while avoiding costly production process.

DETAILED DESCRIPTION OF THE PREFERRED EMBODIMENTS

Figure 1:
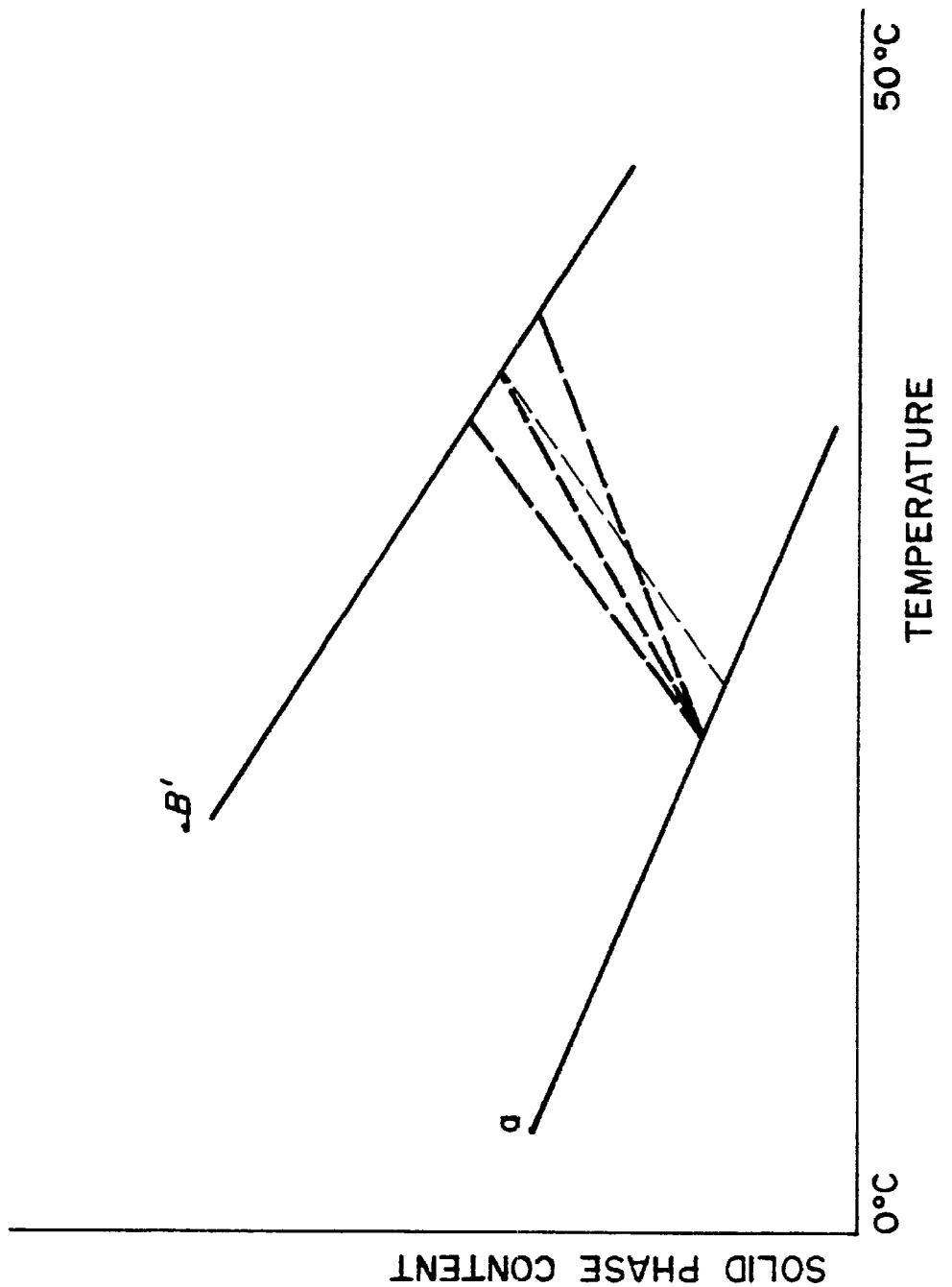
FIG. 1 is a graph illustrating the crystallization of a fat from an alpha to a beta prime phase as the temperature range increases.

The process in the present invention provides a means of preparing a low trans fatty acid containing spread product by recirculating the partially crystallized cooled emulsion to obtain a desirable residence time without the common place problem of post crystallization during storage.

The spread is prepared by combining an oil or fat phase in an aqueous phase. Depending on the desirable level of fat in the final product, the fat phase must contain 5 to 40% of a hardstock which has been interesterfied and 60 to 95% of a liquid oil to form a product having a trans fatty acid level of no more than 10%. A partially or fully hardened vegetable oil may optionally be added to the fat phase.

Throughout the application, the terms "fat" and "oil" may be interchanged and refer to a variety of edible fatty triglycerides, such as soybean oil, cottonseed oil, peanut oil, olive oil, palm oil, corn oil, rapeseed oil, sunflower seed oil, sesame oil, safflower oil and mixtures thereof. If animal oils are desirable, sardine oil, lard and tallow may be used. Preferred vegetable oils include soybean oil, rapeseed oil, particularly low erucic acid, and mixtures thereof. To increase the levels of trans fatty acids in triglycerides, the vegetable oil may be partially or fully hardened.

Edible substances that are physically similar to triglyceride such as waxes, (e.g. jojoba oil) and poly fatty acid esters of mono- or disaccharides that can be used as replacement or in add mixture with triglycerides may also be used.

The fat blend or hardstock useful in the invention should contain less than 10% trans fatty acids, preferably 0.1 to 8%, most preferably 0.1 to 4%. The hardstock is preferably prepared by randomly interesterfying a mixture containing 30 to 75 wt. % of an oil (i) in which at least 20% of the fatty acid residues consist of linoleic acid and 25 to 70 wt. % of a fat (ii) in which at least 80% of the fatty acid residues is saturated and have a chain link of at least 16 carbon atoms. The interesterfied mixture is then fractionated to contain an olefin having the following solid fat content:

$N_{10}$=22 to 80
$N_{20}$=8 to 60
$N_{30}$=1 to 25
$N_{35}$=0 to 15

The higher melting stearin is separated and 50 to 90% of the olefin is mixed with 10 to 50 wt. % of an oil (iii) in which at least 40% of the fatty acid residues consist of linoleic acid.

The solid fat contents are expressed in N-values, essentially as described in Fette, Sefein, Anstrichmittel Vol. 80, pp. 180–186 (1978). Although the method was modified during the stabilization of the material before measurement, in all cases the fat was stabilized for 16 hours at 0° C. and one hour at the measuring temperature.

Oil (i) preferably is a vegetable oil, such as soybean oil, sunflower oil, safflower oil, rapeseed oil, particularly low erucic acid, cottonseed oil, maize oil, olive oil and mixtures thereof.

The oil or fat (ii) preferably is any of the oils (i) or a mixture thereof, which has been hydrogenated to obtain a fat in which at least 80% of the fatty acid residues is saturated using, for example, a freshly precipitated nickel catalyst under conditions avoiding trans fatty acids formation to a level of less than 10%. Oil or fat (ii) preferably has a melting point range of 50 to 70° C. and an iodine value of less than 10, preferably less than 5, most preferably about 1.

The oil (iii) preferably is a safflower oil, a sunflower oil, a maize oil, a rapeseed oil, a soybean oil, rapeseed oil, cottonseed oil or mixtures thereof.

Most preferably (i), (ii) and (iii) are from the same source for convenience and for availability for a reasonable price.

Random interesterfication can be carried out in any means known in the art and such as described in U.S. Pat. No. 4,425,371 issued to Stratman et al. on Jan. 10, 1984, herein incorporated by reference.

Fractionation can be carried out either in the presence or absence in a solvent, preferably using dry fractionation. An olein fraction obtained from the fractionation process is defined above a stearin obtained has the following characteristics;

$N_{10}$=45–70
$N_{11}$=44–65
$N_{20}$=42–52
$N_{25}$=30–40
$N_{30}$=27–37
$N_{35}$=20–30

The aqueous phase comprises from about 20 to about 70% water, preferably 20 to 60%. The mean aqueous phase droplet size distribution of the dispersed aqueous phase in the final product is less than about 10 microns, preferably less than about 5 microns and the amount of free water present is less than about 5%, preferably less than 3%, most preferably 0%. Free water is defined as the water in the droplet of greater than 200 microns. The droplet size and distribution is determined by a method described in van den Enden, D. et al., J. Colloid, Interface Science 140(i) (1990) pp 105–113 and also described in U.S. Pat. No. 5,302,408, herein incorporated by reference.

The compositions may also comprise dairy and non-dairy ingredients of the source of fat, flavoring and protein. The amount of the ingredient present in the compositions is selected depending on the effect of the protein ingredient on mouth feel and sourness. The dairy fat can be derived from any dairy source such as whole milk, semi-skimmed milk, skimmed milk, cultured buttermilk, buttermilk powder, skimmed milk powder, yogurt, quark, fromage frais, cottage cheese, white powder, butter, etc.

To affect the flavor of the sticks of the invention dairy fat may optionally be incorporated in the product by using at least 3% of a dairy ingredient in the spread. The optimum level of dairy ingredients will be dependent on the type and fat level of the dairy product. Emulsifiers may also be included in the aqueous or fat phase. The amount and kind of emulsifier are not critical. It is preferred to incorporated emulsifiers of the type and quantity as are commonly used in spread and margarine products. For example, mixtures of mono- and diglycerides derived from natural, partially hydrogenated or fully hardened sunflower oil considerably be used, in an amount of 0.05 to about 0.5 wt. %, about 0.5 wt. %, calculated on the total weight of the product.

Minor amounts of optional ingredients can be included in the water phase of the formulation to achieve a desirable flavor and to retard microbiological deterioration of the product or in storage. Typical optional ingredient which are incorporated in the water phase are:

| | |
|---|---|
| salt, NaCl | 0.5 to 3.0 wt. % |
| potassium sorbate | 0.02 to 0.2 wt. % |
| EDTA | 50 to 100 ppm |

In the process according to the invention, the residence time required to produce a good quality product economically and without brittleness is achieved through the recirculation of the partially crystallized cooled emulsion. Consumer acceptable spread products are achieved when the processing conditions substantially transform the alpha crystals of the fat phase into beta prime crystals in the C-unit. The time required for this transition to occur in a fat blend during processing is called the transition time. The transition time is pronouncedly affected by the trans fatty acid content of the fat blend. Specifically, the higher the trans fatty acid content the shorter the transition time and thus the shorter the residence time or the time needed in a processing line to process the product. As the trans fatty acid content is reduced, the residence time required to produce the product increases significantly. For example, fat blends having a trans fatty acid content of less than 10% have been observed to have transition times which vary from 4 min. to 20 min. Adiabatic crystallization technique is normally used to characterize the solid phase and crystallization behavior of the fat blend. The data from this type of measurement can be used to derive the parameters for the description of the alpha and beta prime lines as illustrated in FIG. 1, heat of fusion for the alpha and beta prime modification, etc.

Figure 2:
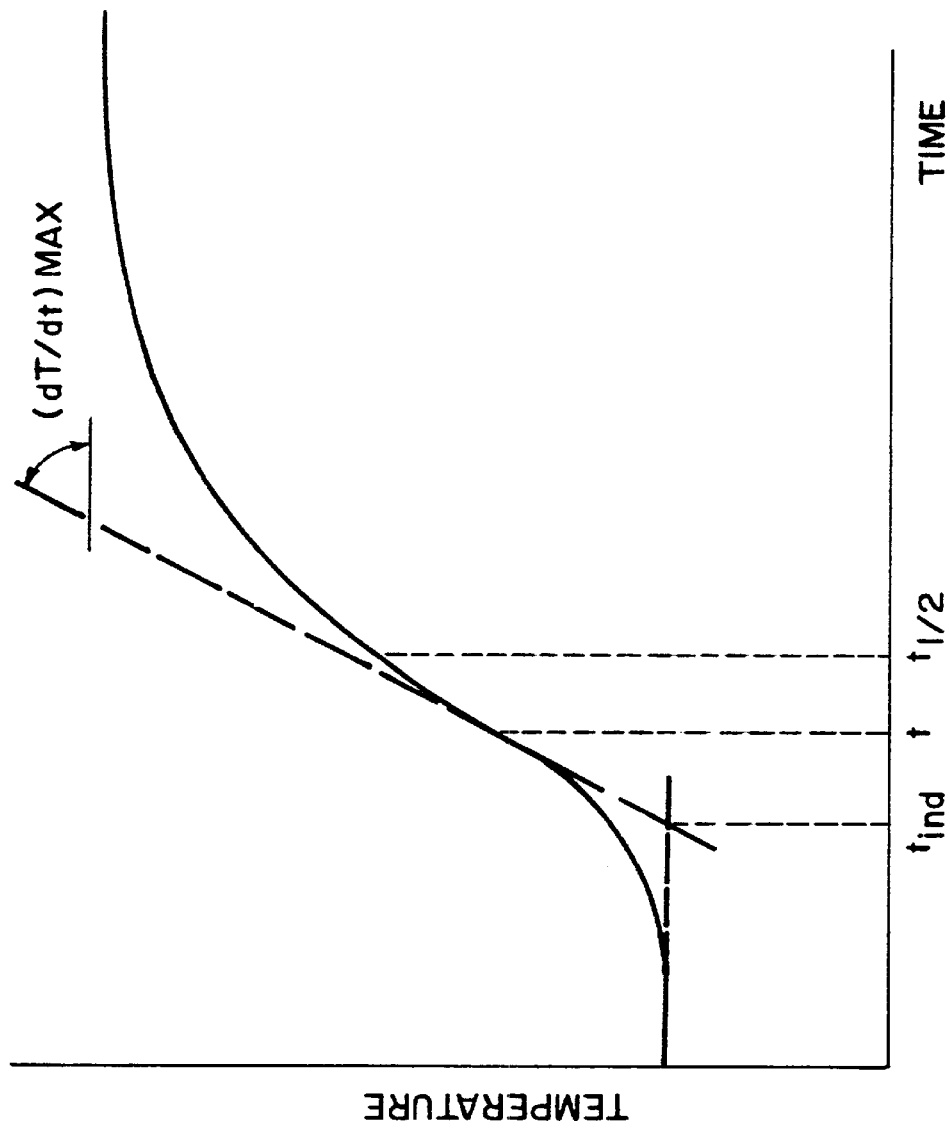
FIG. 2 is a graph illustrating the sigmoidal curve representing the transition time of a fat crystal from its alpha to its beta prime phase as a function of temperature and time from adiabatic crystallization experiment.

To calculate the transition time for a particular fat blend, an adiabatic crystallization technique conducted at various temperatures is used to characterize the crystallization phases of the fat blend as temperatures are increased from 0° C. to 50° C. As the temperature increases it is observed that the solid phase content of the fat blend changes consistently from the alpha phase to the beta prime phase with a rise in temperature due to heat of crystallization until substantially all of the crystals are in the beta prime phase (see FIG. 2).

From this graph the Tau (where dT/dt is maximum) can be determined.

A master curve can then be generated by plotting starting temperatures used in the adiabatic crystallization experiments vs. Tau provides the information on the transition time for a fat blend. The transition time is longer for fat blends with low trans fatty acids.

As the transition time increases with the reduction in the trans fatty acid content, the residence time required in a production line to achieve the desired crystalline phase also increases. The prior art method of increasing residence time was typically to add additional crystallizer units (C-units) to the processing lines. With fat blends having less than 10% trans fatty acids, this method is not only expensive and not commercially viable, but also leads to products of poor quality.

Therefore, it was discovered that recirculating the partially cooled emulsion back into a cooled emulsion stream achieved the residence time necessary and introduced the crystal seeds into the process for a good spread product without expensive processing.

The recirculation step may occur in any conventional processing line for spread products. Typically, the fat and aqueous phases are introduced into one or more scrapped surface heat exchanger units (A-units), mixed to form an emulsion and cooled and then passed into one or more crystallizer units (C-units) for the conversion of the fat crystals to beta prime phase. Optionally, additional A-units, C-units and a B-unit or packing unit may be added to the end of the line.

In the prior art, recirculation has been used by recirculating the partially crystallized emulsion back into the beginning of the line or introducing it into the first A-unit. The result was that cooled and crystallized emulsion was mixed with a relatively hot mixture of fat, typically greater than about 30° C. Additionally, recirculation is generally used in spread production to reuse partially crystallized emulsion which will not form a good quality spread and can be recycled.

It has been discovered that recirculating a partially cooled emulsion into a cooled emulsion stream exiting from an A-unit at a specific recirculation flow rate relative to a throughput of the initial emulsion stream provides a residence time which produces products which are not brittle due to post storage crystallization.

The aqueous and fat phases are added to a first heat exchanger unit (A-unit) in a batch wise manner or in a continuous process by separately metering each component into the A-unit. The A-unit mixes the fat and aqueous and also cools the emulsion to start the crystallization process. The temperature change in the A-unit must be relatively low, specifically in the range of less than 20° C., preferably 2 to 15° C., most preferably 4 to 8° C. The temperature of the emulsion in the A-unit is measured as an exit temperature as the cooled emulsion exits the A-unit and passes into a crystallizing unit (C-unit).

The term for the rate that the emulsion flows through the production line is "throughput". Throughput is measured as x kilograms per hour. As the cooled emulsion passes from the A-unit into the C-unit, the alpha phase crystals of the fat in the cooled emulsion are converted to beta prime phase crystals and the degree of conversion proportional to the square root of the bracket {(residence time/transition time) times the shaft speed of the C-unit}. The degree of conversion of the crystals from alpha to beta prime phase ranges from 0 (alpha phase) to 1 (beta prime).

The residence time of the cooled emulsion in the crystallizer unit (C-unit) is designated as y minutes in given by volume of C-unit(s) divided by volumetric flow rate (throughput).

The cooled emulsion containing a mix of alpha and beta prime crystals exits the C-unit and passes into additional C, A and B units as desired. The partially crystallized cooled emulsion is then recirculated back into the cooled emulsion stream as it exits from the A-unit into the first C-unit. The rate at which the partially crystallized cooled emulsion is recirculated is termed the recirculation flow rate and ranges from 0.2 x to 10 x, preferably from 0.5 x to 4 x.

The shaft rotation speed or shear rate in the C-unit should be such as to provide residence time to convert the fat crystals to beta prime crystals and yet not be high as to break apart the crystals formed in the fat. The preferred rotor speed or shear rate is 150 to 1500 rpm, preferably 150 to 800 rpm.

The final emulsion ready for packing as a product in any conventional form (e.g. tub, stick, etc.) preferably has a mean aqueous phase droplet size distribution of the dispersed aqueous phase of less than about 10 microns, preferably less than about 5 microns and the amount of free water present is less than about 5%, preferably less than about 3% as described above (see van den Enden et al., Supra). As the fat level in the final product decreases below about 40%, the preferred droplet size may increase, but still should be no greater than 20 microns for any form of the product. A product having greater than about 20 microns is not microbilogically stable.

The residence time of the emulsion in the production process line including recirculation time should be about 4 to about 20 minutes, depending on the trans fatty acid content of the fat blend. For example, emulsions containing greater than about 4% trans fatty acids may require less residence time in line than emulsions having less than 4% trans fatty acids.

The following examples illustrate without limitation the subject invention.

EXAMPLE 1

Examples were prepared according to the inventive process including the recirculation step and also according to the prior art method. The formula for the samples was:

Four samples were prepared according to the inventive process having the following formula of 68% fat:

| Oil Phase | Weight % |
| --- | --- |
| Soybean oil | 46.8 |
| Interesterfied hardstock-dry fractionated interesterfied mixture of fully hardened soybean oil and liquid oil | 20.2 |
| Saturated distilled monoglyceride (emulsifier) | 0.1 |
| Lecithin | 0.22 |

| Aqueous Phase | Weight % |
| --- | --- |
| Water | 28.7 |
| Salt | 1.6 |
| Whey Powder | 1.7 |
| Preservative | 0.1 |
| Acidifier | 0.05 |

The trans fatty acid percentage of the formed product was less than 2%.

The products were passed through a production line having a sequence of:

A1 unit- ↓-C1 unit- A2 unit- C2 unit- C3 unit- A3 unit- C4 unit- pack.

The processing conditions for the production of the samples were as follows:

| Processing Condition | Sample 1 | Sample 2 | Sample 3 | Sample 4 |
| --- | --- | --- | --- | --- |
| Throughput (Kg/Hr) | 77 | 43 | 78 | 41.5 |
| Recirculation flow rate (Kg/Hr) | 80 | 43 | 0 | 0 |
| A1 Temperature ° C. | 7.7 | 4,9 | 8.1 | 4.9 |
| A1 rpm | 500 | 500 | 500 | 500 |
| C1 temperature ° C. | 12.4 | 11.7 | 11.1 | 12.1 |
| C1 rpm | 150 | 150 | 150 | 150 |
| A2 temperature ° C. | 5.9 | 4.2 | 4.8 | 5.3 |
| A2 rpm | 500 | 500 | 500 | 500 |
| C2 temperature ° C. | | | | |
| C2 rpm | 180 | 180 | 180 | 180 |
| C3 temperature ° C. | 7.4 | 9.5 | 8.6 | 10.2 |
| C3 rpm | 150 | 150 | 150 | 150 |
| A3 temperature ° C. | 7.8 | 8.0 | 7.7 | 8.1 |
| A3 rpm | 500 | 500 | 500 | 500 |
| C4 temperature ° C. | 10.4 | 10.9 | 11.1 | 11.5 |
| C4 rpm | 150 | 150 | 150 | 150 |
| Residence time (minutes) | 8.4 | 15.2 | 8.3 | 15.7 |

The hardness values of the four samples measured in C values were determined with a cone meter as know in the art and the resulting data is shown below:

| Samples | C Value 5° C. at fill time | C Value 5° C. at 4 weeks |
| --- | --- | --- |
| 1 | 46 | 395 |
| 2 | 61 | 253 |
| 3 | 41 | 970 |
| 4 | 41 | 494 |

It was observed that the samples prepared by the inventive process the recirculation step (samples 1 and 2) exhibited a smooth spread with good mouthfeel and melting characteristic. In contrast, the fat spreads produced by the prior art method (samples 3 and 4) exhibited brittle characteristics with poor mouthfeel and spreadability.

What is claimed is:

1. The process for preparing a fat continuous spread in a production line to shorten residence time and increase the crystallization rate, the fat continuous spread having from about 30 to about 80% fat having a trans fatty acid level of less than about 10% the process comprising the steps of:

(1) selecting a structuring amount of a hardstock fat having a level of trans fatty acids not exceeding 10% and prepared by randomly interesterifying a mixture containing 30–75 wt. % of an oil (i) in which at least 20% of the fatty acids residues consists of linoleic acid and 25–70 wt. % of a fat (ii) in which a least 80% of the fatty acid residues is saturated and has a chain link of at least 16 carbons and then fractionating the interesterified mixture to obtain an olein fraction having a solid fat content of:

$$N_{10}=22\text{–}80,\ N_{20}=8\text{–}60,\ N_{30}=1\text{–}25,\ N_{35}=0\text{–}15;$$

(2) selecting an amount of an oil which is liquid at room temperature selected from the group consisting of soybean oil, sunflower oil, fish oil, rapeseed oil, coconut oil and mixtures thereof;

(3) combining the hardstock fat of step (1) and the liquid oil of step (2) to form a fat phase;

(4) preparing an aqueous phase to combine with the fat phase of step (3) to provide a fat continuous emulsion having less than 80% fat in the total composition;

(5) introducing the fat continuous emulsion into a scraped surface heat exchanger unit to cool the emulsion to an exit temperature of less than the temperature needed to transform a substantial amount of the fat crystal into an alpha phase to form a partially crystallized cooled emulsion;

(6) passing the partially crystallized cooled emulsion unit for a shortened residence time sufficient to substantially convent the alpha phase crystals into beta prime crystals in the cooled emulsion;

(7) passing the beta prime containing cooled emulsion into a second scraped surface heat exchange unit to cool the emulsion;

(8) recirculating the beta prime containing cooled emulsion from step (7) into the partially crystallized emulsion of step (5) as the partially cooled crystallized emulsion exits the scraped surface heat exhanger unit and passes in the crystallizing unit of step (6) to introduce crystal seeds into the partially crystallized emulsion;

wherein the throughput of the emulsion throughout the entire production lines x kilograms per hour, the shortened residence time of the emulsion in the crystallizing unit (C-unit) is y minutes and the recirculation flow rate of the emulsion recirculated into the cooled partially crystallized emulsion of step (8) is 0.2 x to 10 x ; and (9) packing the fat continuous spread to form a fat continuous product having less than 80% fat, less than 10% trans fatty acid, less than 5% free water and the product is not brittle due to post storage crystallization.

2. The process according to claim 1 wherein the exit temperature of the cooling emulsion of step (5) is from about 2 to about 15° C.

3. The process according to claim 1 wherein the recirculation flow rate is 0.5 x to 4 x.

4. The process according to claim 1 wherein the transition time to convert the alpha phase fat crystals into a substantial amount of beta prime fat crystals in step (6) in the C-unit is from about 4 to about 20 minutes.

5. The process according to claim 1 wherein the shear rate of the crystallizing unit of step (6) is about 500 to about 1800 rpm.

6. The process according to claim 1 wherein oil (i) is an selected from the group consisting of soybean oil, sunflower oil, fish oil, rapeseed oil, coconut oil, peanut oil, palm oil, corn oil, sesame oil, sardine oil, lard, tallow and mixtures thereof.

7. The process according to claim 1 wherein fat (ii) is a hydrogenated oil having a melting point ranging from 50 to 70° C. and an iodine value of less than 10.

8. The process according to claim 1 wherein partially or fully hardened vegetable oil is added to the liquid oil and hardstock fat in step 3 to form the fat phase.

9. The process according to claim 1 wherein the trans fatty acid level of the spread is 0.1 to 8%.

10. The process according to claim 1 wherein the mean aqueous droplet size distribution is less than 10 microns and the free water content is less than 3%.

* * * * *